(12) United States Patent
Gritzo et al.

(10) Patent No.: US 9,805,588 B2
(45) Date of Patent: Oct. 31, 2017

(54) WIRELESS FIRE PROTECTION VALVE INSPECTION AND MONITORING SYSTEMS, AND METHODS FOR AUTOMATED INSPECTION AND MONITORING OF FIRE PROTECTION SYSTEMS

(71) Applicants: FACTORY MUTUAL INSURANCE COMPANY, Johnston, RI (US); SYNESIX SOLUTIONS AG, Basel (CH)

(72) Inventors: Louis Alan Gritzo, Wrentham, MA (US); Richard Smith, Wrentham, MA (US); Francesco Tamanini, Watertown, MA (US); Markus Dierkes, St. Gallen (CH); Stefan Zanetti, Binningen (CH)

(73) Assignees: Factory Mutual Insurance Company, Johnston, RI (US); SYNESIX SOLUTIONS AG, Basel (CH)

( * ) Notice: Subject to any disclaimer, the term of this patent is extended or adjusted under 35 U.S.C. 154(b) by 108 days.

(21) Appl. No.: 13/835,228

(22) Filed: Mar. 15, 2013

(65) Prior Publication Data

US 2013/0321166 A1 Dec. 5, 2013
US 2014/0225741 A2 Aug. 14, 2014

Related U.S. Application Data

(60) Provisional application No. 61/653,005, filed on May 30, 2012.

(51) Int. Cl.
*G08C 17/02* (2006.01)
*G08B 25/14* (2006.01)
(Continued)

(52) U.S. Cl.
CPC ............. *G08C 17/02* (2013.01); *G08B 25/14* (2013.01); *H04Q 9/00* (2013.01); *G05D 7/0623* (2013.01); *G08B 25/08* (2013.01); *G08B 25/10* (2013.01)

(58) Field of Classification Search
CPC ........ G08B 25/14; G08B 25/08; G08B 25/10; G05D 7/0623
(Continued)

(56) References Cited

U.S. PATENT DOCUMENTS

| 3,721,265 A | 3/1973 | Hoffland |
| 3,827,827 A | 8/1974 | Hill |

(Continued)

FOREIGN PATENT DOCUMENTS

| EP | 1721639 A1 | 11/2006 |
| WO | WO-2004094978 A2 | 11/2004 |

OTHER PUBLICATIONS

International Search Report dated Jun. 4, 2013 in related International Patent Application No. PCT/US2013/032332.
(Continued)

*Primary Examiner* — Hongmin Fan
(74) *Attorney, Agent, or Firm* — Venable LLP; Steven J. Schwarz; Elizabeth Gitlin

(57) ABSTRACT

A wireless fire protection system valve inspection and monitoring system, including: a plurality of valves, each valve including a detecting unit adapted to detect valve state information for the valve, wherein the valve state information comprises at least one of an open state, a partially-open state, and a closed state; at least one collection unit that wirelessly receives the valve state information from the detecting units; and an information module that receives the valve state information from the collection unit and aggregates, stores, and/or reports the valve state information.

20 Claims, 6 Drawing Sheets

(51) Int. Cl.
*H04Q 9/00* (2006.01)
*G08B 25/08* (2006.01)
*G05D 7/06* (2006.01)
*G08B 25/10* (2006.01)

(58) Field of Classification Search
USPC .............. 340/870.01, 605; 73/40; 137/486; 169/16, 60, 5
See application file for complete search history.

(56) References Cited

U.S. PATENT DOCUMENTS

| | | | |
|---|---|---|---|
| 4,202,180 A | 5/1980 | Cox | |
| 4,286,624 A | 9/1981 | Clausen et al. | |
| 4,485,739 A | 12/1984 | Emmett | |
| 4,522,233 A | 6/1985 | Mojadad | |
| 4,590,999 A | 5/1986 | Snaper | |
| 5,259,556 A | 11/1993 | Paige et al. | |
| 5,293,551 A * | 3/1994 | Perkins | E21B 34/066 251/129.01 |
| 5,390,744 A | 2/1995 | McHugh | |
| 5,584,319 A | 12/1996 | Cholin | |
| 5,665,898 A | 9/1997 | Smith et al. | |
| 5,680,329 A | 10/1997 | Lloyd et al. | |
| 5,864,278 A | 1/1999 | Becher | |
| 5,865,206 A | 2/1999 | Steigman et al. | |
| 5,944,055 A | 8/1999 | Dicky | |
| 5,950,150 A | 9/1999 | Lloyd et al. | |
| 6,081,196 A | 6/2000 | Young | |
| 6,089,252 A | 7/2000 | Braun | |
| 6,195,002 B1 | 2/2001 | Evans, Jr. et al. | |
| 6,302,146 B1 | 10/2001 | McHugh | |
| 6,367,504 B1 | 4/2002 | Knapp | |
| 6,615,927 B1 | 9/2003 | Kim | |
| 6,637,462 B2 | 10/2003 | Foster, Jr. et al. | |
| 6,641,372 B2 | 11/2003 | Rytlewski et al. | |
| 6,766,835 B1 | 7/2004 | Fima | |
| 6,896,066 B2 | 5/2005 | Gil | |
| 6,992,590 B1 | 1/2006 | Tietsworth et al. | |
| 7,032,435 B2 | 4/2006 | Hassenflug | |
| 7,048,068 B2 | 5/2006 | Paulkovich | |
| 7,137,408 B2 | 11/2006 | Royse | |
| 7,313,973 B2 | 1/2008 | Shachar et al. | |
| 7,343,932 B2 | 3/2008 | Manson et al. | |
| 7,509,976 B2 | 3/2009 | McNerney et al. | |
| 7,591,322 B2 | 9/2009 | Olson et al. | |
| 7,633,393 B2 | 12/2009 | Bonne | |
| 7,778,736 B2 | 8/2010 | Sutardja | |
| 7,836,966 B2 | 11/2010 | McHugh et al. | |
| 7,886,766 B2 | 2/2011 | Radomsky et al. | |
| 2003/0045946 A1 * | 3/2003 | Hattori et al. | 700/27 |
| 2005/0087235 A1 | 4/2005 | Skorpik et al. | |
| 2005/0236594 A1 | 10/2005 | Lilly et al. | |
| 2005/0257938 A1 | 11/2005 | Elsey | |
| 2005/0279961 A1 * | 12/2005 | Royse | 251/315.01 |
| 2006/0225796 A1 * | 10/2006 | Hendrix | 137/624.12 |
| 2006/0272830 A1 | 12/2006 | Fima | |
| 2007/0008099 A1 * | 1/2007 | Kimmel et al. | 340/506 |
| 2008/0156121 A1 * | 7/2008 | Radomsky et al. | 73/865.8 |
| 2009/0293972 A1 | 12/2009 | Chou et al. | |
| 2010/0065287 A1 | 3/2010 | Burkhart et al. | |
| 2010/0116365 A1 | 5/2010 | McCarty | |
| 2010/0131084 A1 | 5/2010 | Van Camp | |
| 2010/0193203 A1 | 8/2010 | Reilly et al. | |
| 2010/0263882 A1 | 10/2010 | Bodemann | |
| 2011/0074602 A1 * | 3/2011 | Cornwall et al. | 340/870.02 |
| 2011/0140908 A1 | 6/2011 | Kosht et al. | |
| 2011/0203685 A1 | 8/2011 | Lin et al. | |
| 2011/0205055 A1 | 8/2011 | Smaidris et al. | |
| 2012/0012345 A1 | 1/2012 | Gamble et al. | |
| 2012/0031632 A1 | 2/2012 | Reilly et al. | |
| 2012/0056711 A1 | 3/2012 | Hanrahan et al. | |
| 2014/0001383 A1 * | 1/2014 | Staffiere et al. | 251/129.01 |
| 2014/0225741 A2 * | 8/2014 | Gritzo | H04Q 9/00 340/870.01 |

OTHER PUBLICATIONS

Written Opinion of the International Searching Authority dated Jun. 4, 2013 in related International Patent Application No. PCT/US2013/032332.

* cited by examiner

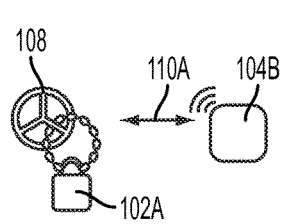
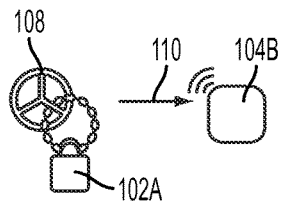
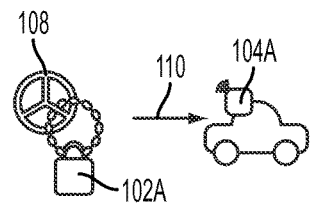
FIG. 4A　　　　　　FIG. 4B　　　　　　FIG. 4C
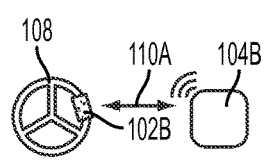
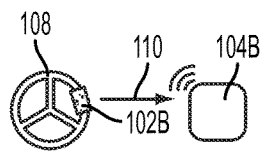
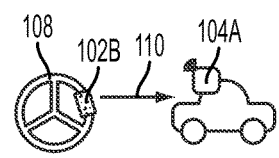
FIG. 4D　　　　　　FIG. 4E　　　　　　FIG. 4F
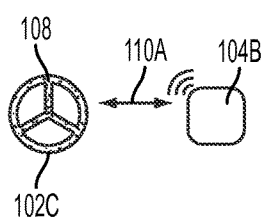
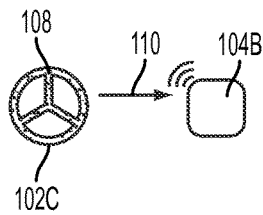
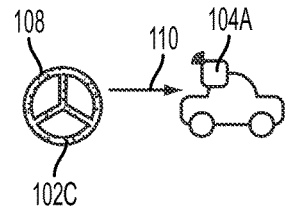
FIG. 4G　　　　　　FIG. 4H　　　　　　FIG. 4I

WIRELESS FIRE PROTECTION VALVE INSPECTION AND MONITORING SYSTEMS, AND METHODS FOR AUTOMATED INSPECTION AND MONITORING OF FIRE PROTECTION SYSTEMS

CROSS-REFERENCE TO RELATED APPLICATIONS

This patent application claims the benefit under 35 U.S.C. Section 119 of U.S. Provisional Application No. 61/653,005, filed on May 30, 2012, the entire content of which is incorporated herein by reference.

TECHNICAL FIELD

This patent application relates generally to fire protection systems and methods. More specifically, this patent application relates to wireless systems and automated methods for remotely inspecting and monitoring fire protection valves and systems in order to replace or supplement current manual inspection of fire protection valves and systems.

BACKGROUND

Today, sprinkler valves are typically pure mechanical components of fire protection systems (FPSs). Their state usually determines the availability of sprinkler protection in areas downstream of the valve. Fires in premises with improperly closed valves (ICVs), which inhibit sprinkler operation, are believed to result in property losses eleven to twelve times more costly than fires in premises that are sprinkler protected.

In order to ensure operation of fire protection systems, businesses typically conduct manual inspections of sprinkler valves according to specific guidelines. Depending on the distribution of valves and valve types at a given facility, manual inspections of a typical United States or European site are believed to cost approximately $150 to $200 per valve per year. Furthermore, the manual inspections are human-led and may therefore not be as reliable as desired. For example, the average failure rate of human-led inspection in detecting ICVs is believed to be ten percent, meaning one out of ten improperly closed valves is not identified. Therefore, there is a need for an automated solution that leads to higher reliability as well as increased efficiency.

Fire protection valves are available with switches and wires that can be used to send signals regarding their status. The known valves and systems incorporating them are cost prohibitive, not robust, and unreliable for use in fire protection systems, and hence they have not been widely adopted or incorporated into applicable standards. This may be due to three main reasons: (1) facilities that warrant these valves typically include a large number of valves, thus wired systems require extensive wiring; (2) frequently fire protection valves are located at large distances from each other and from central fire protection management systems, further increasing costs and posing reliability concerns for wired systems; and (3) many fire protection system valves are already in place, and hence retrofitting, or adding new wired sensors to existing valves or new valves to existing systems can be costly and cumbersome.

SUMMARY

According to an embodiment, a wireless fire protection system valve inspection and monitoring system, comprises: a plurality of valves, each valve including a detecting unit adapted to detect valve state information for the valve, wherein the valve state information comprises at least one of an open state, a partially-open state, and a closed state; at least one collection unit that wirelessly receives the valve state information from the detecting units; and an information module that receives the valve state information from the collection unit and aggregates, stores, and/or reports the valve state information.

According to another embodiment, a method for automatically inspecting and monitoring a fire protection system comprises: detecting and logging the state of each fire protection valve in a plurality of valves, wherein the valve state information comprises at least one of an open state, a partially open state, and a closed state; wirelessly receiving the valve state of each valve from the plurality of valves using a collection unit; transmitting the valve state of each valve from the collection unit to an information module; and transmitting the valve state of each valve from the information module to a building information systems and maintenance management program.

BRIEF DESCRIPTION OF THE DRAWINGS

The features and advantages of the invention will be apparent from the following description, as illustrated in the accompanying drawings wherein like reference numbers generally indicate identical, functionally similar, and/or structurally similar elements.

FIGS. 4A, 4B, 4C, 4D, 4E, 4F, 4G, 4H, and 4I are schematic representations of various embodiments and combinations of wireless fire protection valves and associated communication modes.

DETAILED DESCRIPTION

Figure 1:
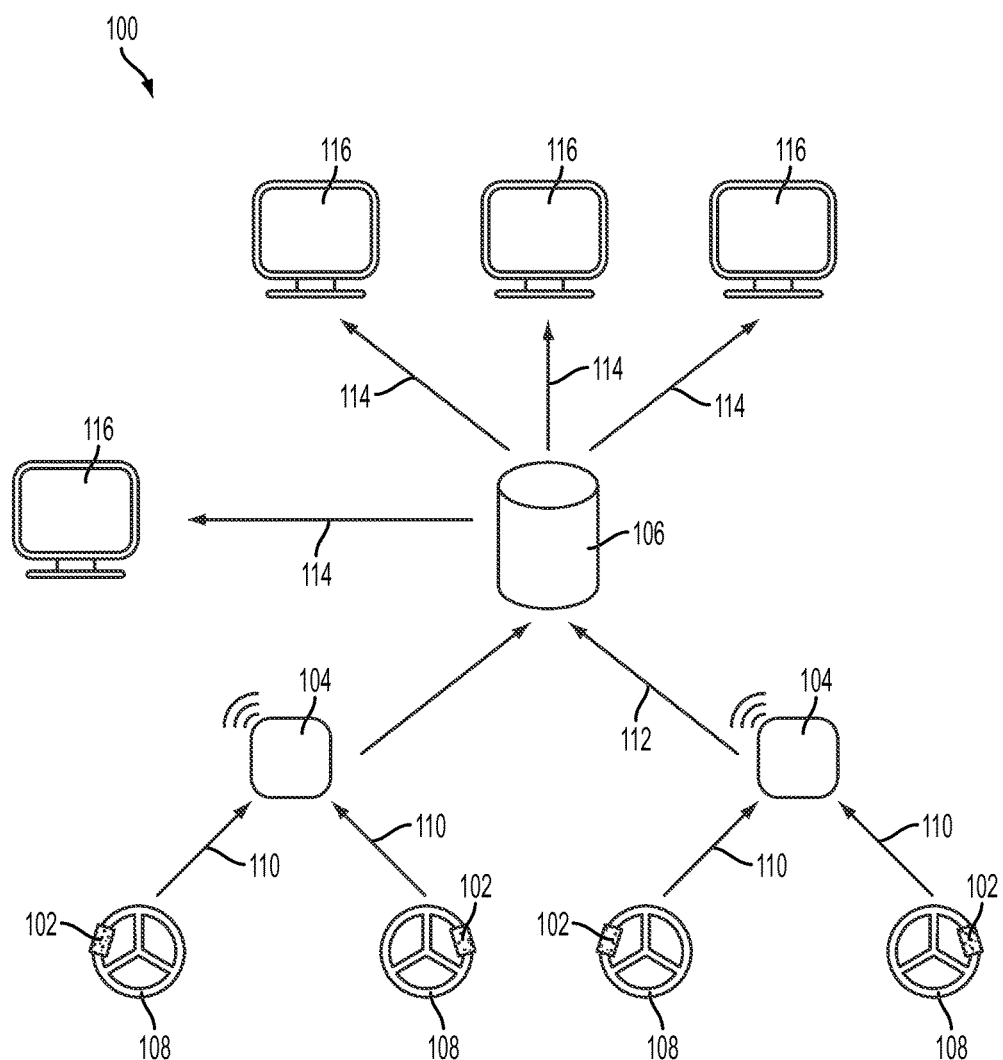
FIG. 1 is a schematic representation of an embodiment of a wireless fire protection valve inspection and monitoring system.

Embodiments of the invention are discussed in detail below. In describing embodiments, specific terminology is employed for the sake of clarity. However, the invention is not intended to be limited to the specific terminology so selected. While specific embodiments are discussed, it should be understood that this is done for illustration purposes only. A person skilled in the relevant art will recognize that other components and configurations can be used without departing from the spirit and scope of the invention.

Embodiments of this application relate to wireless fire protection valve inspection and monitoring systems, and as well as methods for automated inspection and monitoring of fire protection systems (FPSs). Normally, the valves in a fire protection system are set in the fully open position, allowing full fluid flow through the valves. Rarely do FPS valves need to be manipulated from the fully open position, e.g. moved to a partially or fully closed condition. Manipulation of FPS valves is normally due to planned maintenance or inspection activities. On occasion, FPS valves may be manipulated as a result of unsupervised or malicious actions.

A primary goal of today's manual fire protection system inspection practices is the reduction of instances of improperly closed valves (ICVs). According to embodiments, an ICV is defined as a valve controlling a water supply to an existing fire protection system that is not in the fully open position either: (1) without a legitimate reason; and/or (2) with a legitimate reason but longer than necessary; and/or (3) without proper authorization and notification.

Embodiments of the present application relate to a system that provides the ability to monitor the status of valves in a fire protection system, and/or record operation and report activity according to a maintenance schedule that may include semi-continuous monitoring by software, or by visual inspection, with significantly less labor and increased frequency than allowed by current manual inspections. According to embodiments, the system can comprise an integrated system of sensors, wireless technology, and/or reporting software.

Through a combination of detection devices, collection devices, information gathering devices and/or software programs, the embodiments of the system described herein can provide a fully automated alternative to the current practices of manually inspecting FPS valves. For example, and without limitation, it can replace a person visually observing or physically manipulating the valves. According to embodiments, the system can reduce instances of improperly closed valves. Additionally or alternatively, the system can assist in the management of maintenance and inspection activities. According to embodiments, the system can report FPS valve status as either "open" or "not open," however, in other embodiments, additional states such as "closed" can also be reported. According to embodiments, reporting can comprise a visual depiction or audible alert on a computer, tablet computer, mobile phone, or other device. Alternatively, reporting can comprise an automated telephone call, for example, to a person having designated responsibility for the facility in which the system 100 is housed, and through regular maintenance management of building control system. Alternatively, reporting can comprise text messages, e-mails, alarm sounds or electrical signals that can be sent to mobile collecting units and/or alarm panels/system administrators, etc.

According to embodiments, a FPS valve according to the present application may be referred to, without limitation, as a "smart valve," meaning that the valve can reliably detect its status (e.g., open or not open), log its status, and/or communicate its status or changes in status. According to embodiments, smart valve technology can be integrated into new valves, or alternatively, smart valve technology can be retrofitted into existing equipment. According to embodiments, a "smart valve system" may refer, without limitation, to an automated and/or wireless inspection system focusing on the detection of status of FPS valves and related manipulation events. According to embodiments, a smart valve system can eliminate the typical routine weekly visual and/or monthly physical inspections of FPS valves. Embodiments of a smart valve system can also be configured to perform other valve- and FPS-related maintenance management tasks, such as, for example, onsite support of operators during annual and/or five-year maintenance cycles.

Referring to FIG. 1, an embodiment of a wireless fire protection valve inspection and monitoring system 100 is shown. Generally, the system 100 can include detecting unit(s) 102, collection unit(s) 104, and one or more information modules 106.

Still referring to FIG. 1, the detecting units 102 can comprise sensors located on FPS valves 108, for example, with the ability to detect and/or log real-time state changes of the valve. For example, the detecting units 102 can detect and/or log whether the respective FPS valve is in the "open," "not open," or "closed" state. According to embodiments, each detecting unit 102 can communicate sensed and/or logged data to the corresponding collection unit 104, for example, through a communication interface 110. According to embodiments, the interface 110 can comprise a wireless interface using standard industry protocols, including non-proprietary or proprietary protocols, e.g., for wireless secured communication between the detecting units 102 and the collection units 104, however other configurations, including relay stations, or smaller subcollection units are possible. Embodiments may include, e.g., various IEEE 80211 protocols (a, b, g, ac, ad, etc.) or various WAP protocols, such as Wireless Application Environment (WAE), Wireless Session Protocol (WSP), Wireless Transaction Protocol (WTP), Wireless Transport Layer Security (WTLs), and Wireless Datagram Protocol (WDP). According to embodiments, the communication interface 110 can be configured for low level-controlled (e.g., weekly) data collection and/or real-time or near-time event notification (e.g., synchronous communication), however, other configurations are possible.

Still referring to FIG. 1, the detecting units 102 can send a valve identifier (e.g., location, name, number, etc.), valve position (e.g., open, not open, closed), and/or the time of the status report to the corresponding collection unit 104. Additionally or alternatively, other data may be reported, such as sensed temperature or humidity. The detecting units 102 can each include local identification, actuation, and/or visualization functions, such as buttons and/or displays for on-site communication (e.g., with maintenance or inspection personnel).

Still referring to FIG. 1, one or more collection units 104 can collect data from the detecting units 102 (e.g., regarding valve status or status changes) via the interface 110. According to embodiments, the collection unit(s) 104 can generally comprise a first communication unit for communication (e.g., RF) with the detecting unit(s) 102, a second communication unit for communication with the information module, a logic unit (e.g., µP Microprocessor), and a power supply, however, other configurations are possible. The collection units 104 can communicate with the central information module 106, for example, through communication interface 112. According to an embodiment, the central information module 106 can store valve-related data using, for example, a non-volatile memory sufficient to store a desired amount of valve status data (e.g., five years), however, other embodiments are possible.

According to embodiments, the communication interface 112 can use standard industry protocols, including non-proprietary or proprietary protocols, for wired or wireless (including zigbee, bluetooth, or others) communication between the collection units 104 and the information module 106, however other configurations are possible. For example, according to an embodiment, an Ethernet or WLAN network can be used to request and receive data from the collection unit(s) 104. In the case of an Ethernet link, an Ethernet cable can extend between the information module 106 and the collection unit(s) 104. Alternatively, if WLAN is used, the collection unit(s) 104 and the WLAN infrastructure can be configured to include a wireless link. Alternatively, the information module 106 can interface with the collection unit(s) 104 using WWAN (e.g., GSM, GPRS, UMTS, HSDPA, LTE, CDMA2000, WIMAX). According to an embodiment, a WWAN based integration can provide an optimized data transfer (exchanged data and frequency) between the collection unit(s) 104 and the information module 106. According to another embodiment, a cell phone network can be used for the link between the collection unit(s) 104 and the information module 106, which can provide ease of installation due to the lack of a communication cable or WLAN link.

Still referring to FIG. 1, the information module 106 can aggregate, store, and/or provide FPS valve-related information. According to embodiments, the information module 106 can include communication interface 112 with the collection unit(s) 104, as well as an interface 114 with external applications 116, such as building information systems and maintenance management software (IMM), and related applications and devices, such as desktop and/or handheld devices. Interface 114 can communicate information about valve states and/or state changes to the building's stakeholders (such as facility managers, landlords, operators, insurers, emergency response teams). These may include external entities, as represented by the Client Engineering Activity Manager (CEAM), a system used by FM Global to assist clients risk management activities including tracking closed valves that impair sprinkler systems, shown in FIG. 1. Various interfaces, such as file based transfer, API, etc., may be used for communication interface 114. According to embodiments, the information module 106 can be compatible with some of the main suppliers of building information systems, FPS monitoring systems, and/or FPS panel systems (e.g. Honeywell, DSC/Tyco, Bosch, DMP, Napco, and General Electric).

According to embodiments, the collection unit(s) 104 can report to the information module 106 in one or more of the following circumstances: (a) when one or more of the detecting units 102 has failed to communicate with the respective collection unit 104; and/or (b) when one or more of the detecting units 102 has reported a change in valve state (e.g., from open to not open) since the last reporting period, however, other scenarios are possible. In the latter case, the data reported to the information module 106 can be the same as was reported by the detecting unit 102 to the respective collection unit 104, however, it is contemplated that the format and/or content of this information can be modified before transmission to the information module 106.

According to embodiments, the IMM can immediately or substantially immediately alert or inform the end-user about a change in valve state. For example, the external application(s) 116, such as the CEAM interface (an application belonging to FM Global, the assignee of the present application) can automatically notify external parties, such as insurance companies, about a change in valve state. This information can then be logged into a third party tracking database maintained by the third party for further follow-up inspection and/or adjustment of the respective FPS valves, as needed. According to embodiments, the external application(s) 116 can provide the valve identifier (e.g., location, name, number) and time of valve state changes, however, additional or different information may also be provided.

The system 100 can be integrated with the external application(s) 116 in at least two different manners. According to an embodiment, pull integration can be utilized, in which the external application(s) 116 actively request information from the information module 106. This can be done, for example, via a text file delivered by the information module 106. Alternatively, it can be done via an API based integration in which the external application 116 uses a predefined command set to retrieve the required information from the information module 106, and/or to set specific configuration values (e.g., alert limits). According to another embodiment, push integration can be used, wherein the information module 106 immediately or substantially immediately pushes new events (e.g., valve XY changed its state form "OPEN" to "UNKNOWN" on 13:45:15, 13 Jul. 2011) to the external application(s) 116. According to a push integration embodiment, the external application 116 may continuously listen for new information to be published by the information module 106.

Figure 2:
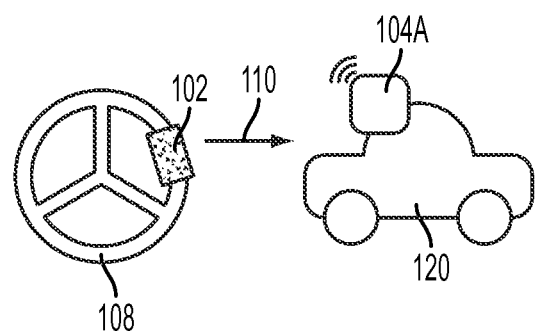
FIG. 2 is a schematic representation of an embodiment of a mobile collection unit used in the system of FIG. 1.

Referring to FIG. 2, one or more of the collection units 104 may comprise a mobile collection unit 104A, for example, it may be adapted and configured for attachment to any kind of known vehicle 120, such as a car, plane, helicopter, unmanned aircraft, boat, or the like. The mobile collection unit 104 can alternatively comprise a hand-help mobile device. In either case, the mobile collection unit 104A can be transported into communication range with the detecting units 102 to collect data from the detecting units 102, e.g., via the communication interface 110. The communication interface 110 can link the mobile collection unit 104A to the information module 106 periodically, for example, using a docking station (e.g., local link (USB) to a personal computer or Ethernet link), WLAN, WWAN infrastructure, and/or other wired or wireless technologies. The mobile collection unit 104A can periodically (e.g., weekly) collect stored valve state data from the detecting units 102, and can monitor that valve states have been controlled, and that any deviation has been detected and chronologically contained.

Figure 3:
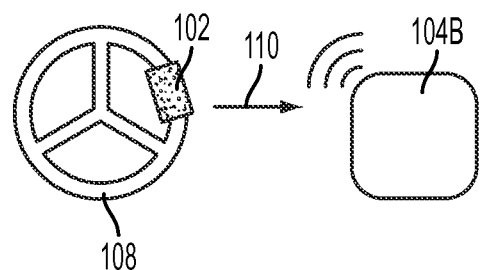
FIG. 3 is a schematic representation of an embodiment of a fixed collection unit used in the system of FIG. 1.

Referring to FIG. 3, an alternative embodiment can utilize one or more fixed collection unit(s) 104B, such as fixed collection unit 104B that communicates directly with the detecting unit(s) 102 located throughout the building. This embodiment can provide high level, real-time or near-time event notification, for example, in order to provide up-to-date information on current valve states and to support impairment control tasks. Real-time or near-time notification of valve state event changes may allow for a higher level of process control and thus shorter reaction times in critical situations.

Referring to FIG. 4A through 4I, various interfaces between valve 108 and the detecting unit 102 are shown. According to the embodiments of FIGS. 4A-4C, the detecting units can comprise smart locks 102A that can be used to provide wireless valve state detection capability to existing valves. For example, a smart lock 102A may comprise a device that is adapted to be placed on a valve to physically secure it in the desired position, and can transmit a signal upon being unlocked (e.g., manipulated by a human). According to an embodiment, the smart locks 102A do not report actual changes in valve states, rather, they provide an indication that someone has unlocked the valve 108. Additionally or alternatively, the smart locks 102A may indicate whether the valve 108 has been manipulated, but may not automatically re-recognize when the valve is open 108.

According to embodiments, the smart locks 102A can comprise a mechanical interface with the valve 102, however, other configurations are possible, such as electrical, electro-mechanical, and/or optical interfaces. According to embodiments, the detecting unit(s) 102A can comprise an electro-mechanical sensor in direct contact with the valve, or alternatively, other types of sensors such as a Hall Effect (magnetic field) sensor, and/or an accelerometer.

FIGS. 4D-4F depict embodiments where the detecting units can comprise retro-fit units 102B that can be permanently or semi-permanently added to existing valves 108 (e.g., with or without modification to the existing valves), in order to add wireless valve state and/or state change detection and logging capability to existing FPS valves and systems. The specific structures of the retro-fit units 102B can vary depending on the FPS valve 108 to which it is applied, or alternatively, a single, universal retro-fit unit 102B can be configured to fit a variety of different FPS valves 108. Embodiments of retro-fit units 102B may automatically detect open valve states, unknown valve states, and changes in valve state, however, other embodiments are possible. Mechanical fastening of switches and/or accelerometers, or optical, ultrasonic, or magnetic sensors that detect valve motion or action that occurs due to a change in state may be used depending on the design and accessibility of the valve. Additionally or alternatively, the retrofitting can be achieved through various options including attaching a device to the shaft of the valve that moves up and down as the valve is being opened or closed (e.g., to the handle/lever that the rotates components of the valve). Alternatively, the device can be connected to another physical component of the valve. States or state changes can be detected based on an initial known state (e.g. open/not open) that the device is then calibrated or set upon. If, for example, the valve is rotated more than 3 times from the closed state then the retrofit device may be able to determine this and send an alarm signaling the change in state.

Referring to FIGS. 4G-4I, embodiments of the detecting units can be integrated into the FPS valves 108 themselves, for example, upon manufacture. These integrated units 102C can be used, for example, to automatically detect and/or automatically recognize valve open and closed states and, similar to retrofit applications, may employ a sensing technology best suited for the design of the valve.

Referring still to FIGS. 4A to 4I, embodiments of the smart locks 102A, retro-fit units 102B, and integrated units 102C can each include a variety of different communication interfaces 110. For example, as shown in FIGS. 4A, 4D, and 4G, embodiments can include a two-way communication interface 110A, which provides for two-way communication between the detecting unit(s) 102 and the corresponding collection unit 104. Depending on the application, this two-way communication feature may be used to send exchange information for verification or additional details regarding valve states, and open the possibility for additional information or action to be taken in a manner that provides increasing automation. For example, in a two-way communication, the collection unit(s) 104 may send a signal to the detecting unit(s) to either correct adjust or correct the position (e.g., for a wrong reading) or reset its operation or disable it for a short period (e.g., when there is maintenance). Additionally or alternatively, two-way communication can be used in combination with an automated valve to adjust the position of the valve (e.g., move it from open to closed and vice-versa) remotely. This can be accomplished, for example, using actuators and other structures known in the art.

Alternatively, as shown in FIGS. 4B, 4C, 4E, 4F, 4H, and 4I, embodiments can include a one-way communication interface 110, which provides for one-way communication from the detecting unit(s) 102 to the corresponding collection unit(s) 104. The one-way interface can be used, for example, with mobile collection units 104A and/or fixed collection units 104B and/or combinations of the two. Although embodiments disclosed herein utilize wireless communication schemes, alternative embodiments can use wired communication systems for all or portions of the systems and methods described herein.

Figure 5:
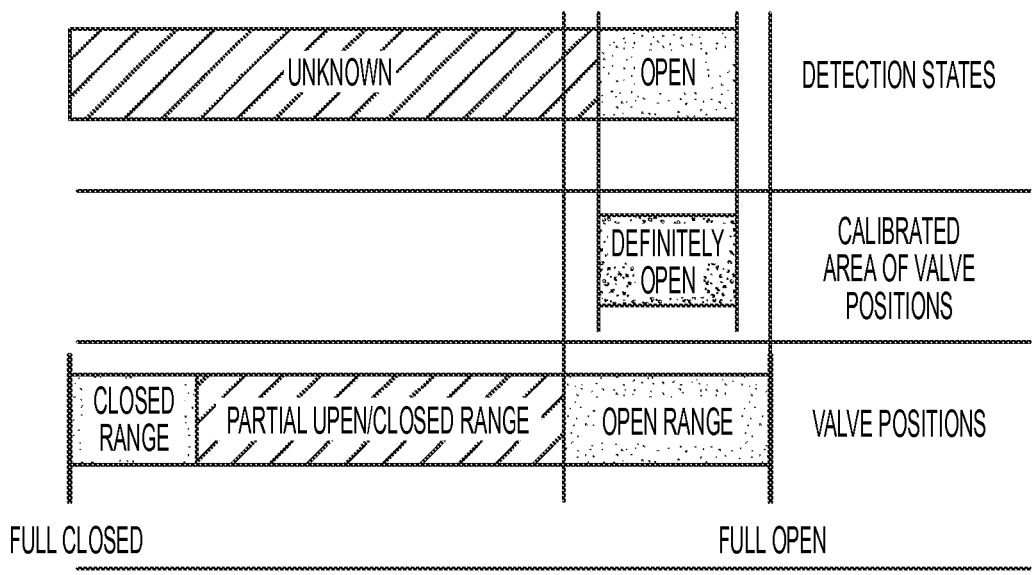
FIG. 5 is a graphical representation of various fire protection valve positions and detection states.
Figure 6A:
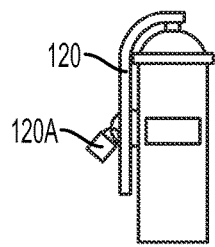
FIGS. 6A, 6B, 6C, 6D, 6E, 6F, 6G, and 6H depict a variety of valve types that incorporate wireless inspection and monitoring systems disclosed in the present application.
Figure 6B:
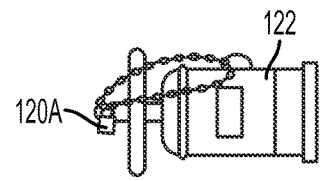
Figure 6C:
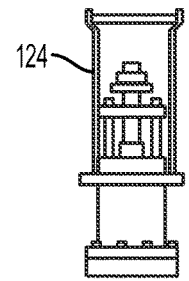
Figure 6D:
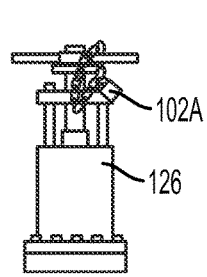
Figure 6E:
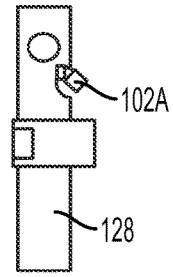
Figure 6F:
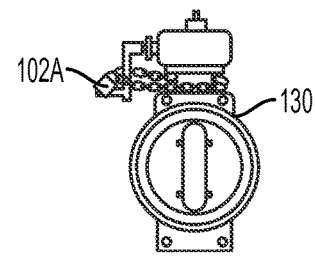
Figure 6G:
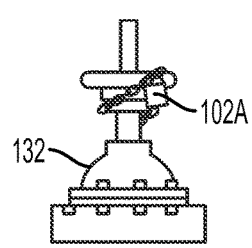
Figure 6H:
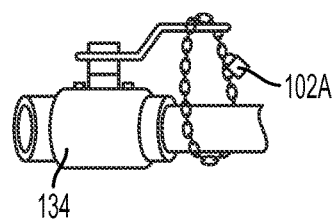

Referring to FIG. 5, possible valve positions ranging from full closed to full open are depicted in the bottom of the figure, and the corresponding detection states (e.g., "unknown" and "open") output by an embodiment of the system 100 are depicted in the top of the figure. As indicated, embodiments of the system 200 can be configured to identify the "open" state or its absence (e.g., "unknown"). As a result, determination of the precise position of the valve 108 may not be required, thereby reducing the complexity and/or cost of the valves 108 and/or detecting units 102. In the event of an "unknown" valve status, a person may manually inspect the state of the valve, however, other practices are possible.

In order for the valve to identify the "open" and "unknown" states, the detecting unit can be calibrated after installation in order to store information about the "open" position. According to an embodiment, the calibration function only needs to be executed once in order to avoid additional calibration efforts after closing a valve and restoring it to the open position. According to an embodiment, the calibration function stores an area/range, shown as "definitely open" in FIG. 5, where the valve 108 is definitely open. According to an embodiment, the valve's detection functionality recognizes when the limits of the calibrated open valve area have been exceeded in order to report valve state changes.

The range of open positions can vary significantly for different types of valves. For example, some valves remain effectively open when turned up to 15 degrees from the full open position (low turning valves). In others, the operating mechanism may need to be turned more than five turns before the valve enters the "not open" state (high turning valves). Therefore, the configuration of the detection device and the corresponding calibration function can vary based on the type of valves being used.

FIG. 6 depicts a variety of different valve types that can be supplied with, retrofitted with, and/or manufactured with detecting units 102. FIG. 6A depicts an example of a post indicator valve 120 equipped with a detecting unit, e.g., a smart lock 102A. FIG. 6B depicts an example of a wall post indicator valve 122, also equipped with a smart lock 102A. FIG. 6C depicts an example of a curb box valve 124 equipped with an integrated detecting unit (not numbered). FIG. 6D depicts an example of a non-rising stem gate valve 126 equipped with a smart lock 102A. FIG. 6E depicts an example of a post indicator valve assembly 128 equipped with a smart lock 102A. FIG. 6F depicts an example of an indicating butterfly valve 130 equipped with a smart lock 102A. FIG. 6G depicts an example of an outside screw and yoke valve 132 equipped with a smart valve 102A. FIG. 6H depicts an example of a quarter turn ball valve 134 equipped with a smart valve 102A. According to embodiments, and with reference to the valve types shown in FIG. 6A to 6H, weekly and monthly manual inspection processes on the valves 120 to 134 can be addressed and substituted by embodiments of the system 100 described herein.

The following table provides non-limiting examples of some of the weekly and monthly inspection processes that can be automatically performed on the valves of FIGS. 6A to 6H by embodiments of the system 100.

| Valve Type | Weekly Processes | Monthly Processes |
| --- | --- | --- |
| Outside screw and yoke (OS&Y), indicating butterfly valves (IBVs), post indicator valve assemblies (PIVAs). | Visually inspect for the full open position and lock. | |
| Post indicator valve (PIV), wall post indicator valve (WPIV), inside screw gate valves. | Visually inspect for the full open position and lock. | Physically test for the full open position and re-lock in the full open position. |
| Curb-box/roadway. | Visually inspect cover and for accessibility. | Physically test for the full open position and leave in the full open position. |

Maintenance processes other than the weekly and monthly inspections identified above can be additionally or alternatively provided by embodiments of the system 100, for example, by delivering onsite identification, support, documentation, and/or tracking functionalities.

| Valve Type | Annual Processes |
| --- | --- |
| Outside screw and yoke (OS&Y), indicating butterfly valves (IBVs), post indicator valve assemblies (PIVAs). | Full turn operation, return to and re-lock in the full open position, and conduct drain test. |
| Post indicator valve (PIV), wall post indicator valve (WPIV), inside screw gate valves. | Full turn operation, return to and re-lock in the full open position, and conduct drain test. |
| Curb-box/roadway. | Full turn operation, return to the full open position, and conduct drain test. |

Figure 7:
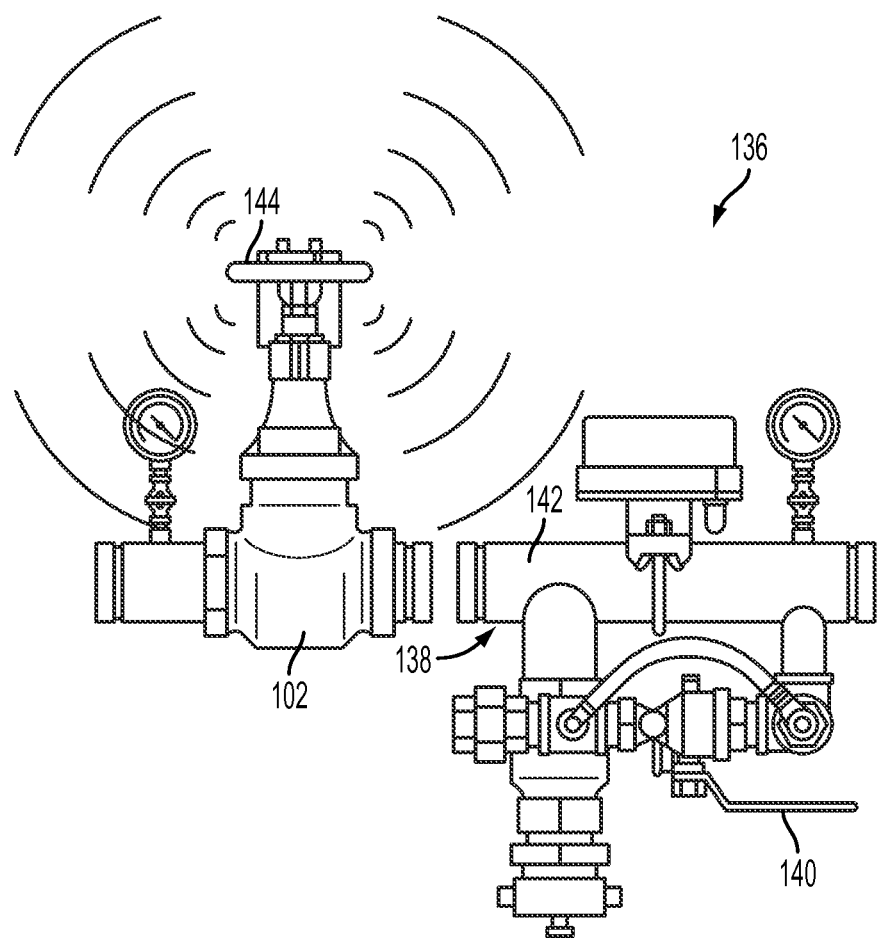
FIG. 7 depicts an embodiment of a valve incorporating wireless inspection and monitoring.

Referring to FIG. 7, an embodiment of a non-rising stem gate valve 136 having an integrated unit 102C is shown. The valve 136 can generally include a valve body 138 that performs conventional valve functions, e.g., controlling the flow of water or other liquid through the valve 136. The valve 136 can also include a valve handle 140 that can be manipulated, for example, by maintenance personnel, to adjust the position of the valve 136. For example, the valve handle 140 can adjust the valve to the open position, closed position, and various positions in between.

Still referring to FIG. 7, the integrated unit 102C can detect the state of valve 136, for example, by sensing the pressure on one side of the valve 136, however, other embodiments are possible. For example, the integrated unit 102C could visually detect the position of the valve through pipe 142, e.g., using an optical or magnetic sensor. The integrated unit 102C can also include an external or internal antennae 144 that sends and/or receives valve state and other information, for example, via various embodiments of interface 110 as described herein above. The configuration of the structure and electronics will vary according to valve type, but in it's simplest form will include an integrated system that is mechanically fixed to, or integrated into the construction of, the valve. [

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. A wireless fire protection system valve inspection and monitoring, system, comprising:
a plurality of smart locks, each smart lock adapted to retrofit onto an existing fire protection system valve, each valve movable through a range of valve positions including a fully-open position, a fully-closed position, and partially-open positions and partially-closed positions between the fully-open and fully-closed positions;
each smart lock including a detecting unit adapted to detect valve state information corresponding to the valve position, the valve state information including a first detection state calibrated to an open range of valve positions including the fully-open position, and a second detection state calibrated to a closed range of valve positions including the fully-closed position and a partially open/closed range comprising the partially-open and partially-closed positions, wherein the detecting unit is adapted to wirelessly send the valve state information;
at least one collection unit that wirelessly receives the valve state information indicating the first detection state or the second detection state from the detecting units by a RF communication interface; and
an information module that receives the valve state information indicating the first detection state or the second detection state from the collection unit and aggregates, stores, and/or reports the valve state information.

2. The system of claim 1, wherein the collection unit comprises a mobile collection unit.

3. The system of claim 1, wherein the collection unit comprises a fixed collection unit.

4. The system of claim 1, wherein the detecting unit communicates valve state information to the collection unit in real-time or near-time.

5. The system of claim 1, wherein the collection unit communicates with the information module by a wireless connection.

6. The system of claim 5, wherein the wireless connection comprises at least one of a wireless local area network or a cellular connection.

7. The system of claim 1, wherein the collection unit communicates with the information module by a wired connection.

8. The system of claim 7, wherein the wired connection comprises an Ethernet connection.

9. The system of claim 1, wherein the collection unit is adapted to store valve state information received from one or more of the detecting units.

10. The system of claim 1, further comprising a communication interface between the information module and a building information systems and maintenance management program.

11. The system of claim 10, wherein the communication interface comprises at least one of a file-based transfer or an API.

12. The system of claim 10, wherein the communication interface uses push integration.

13. The system of claim 10, wherein the communication interface uses pull integration.

14. The system of claim 1, wherein the at least one collection unit transmits the valve state information to the information module only when: (i) one or more of the detecting units fails to communicate with at least one collection unit, and/or (ii) one or more of the detecting units reports a change in the valve state to at least one collection unit.

15. A method for automatically inspecting and monitoring a fire protection system, comprising:
  retrofitting a smart lock onto at least one existing fire protection system valve, each valve movable through a range of valve positions including a fully-open position, a fully-closed position, and partially-open positions and partially-closed positions between the fully-open and fully-closed positions,
  each smart lock including a detecting unit adapted to detect valve state information corresponding to the valve position, the valve state information including a first detection state and a second detection state;
  calibrating the detecting unit to store a range of valve positions corresponding to the first detection state, the first detection state corresponding to an open range of valve positions including the fully-open position;
  calibrating the detecting unit to store a range of valve positions corresponding to the second detection state, the second detection state corresponding to a closed range of valve positions including the fully-closed position and a partially open/closed range comprising the partially-open and partially-closed positions;
  transmitting the valve state information from the smart lock, wherein the valve state information is transmitted via a wireless RE communication interface;
  wirelessly receiving the valve state of each valve from the at least one smart lock using a collection unit via the wireless RF communication interface;
  transmitting the valve state of each valve indicating the first detection state or the second detection state from the collection unit to an information nodule; and
  transmitting the valve state of each valve indicating the first detection state or the second detection state from the information module to a building information systems and maintenance management program.

16. The method of claim 15, further comprising alerting a user about a change in the valve state.

17. The method of claim 15, wherein the collection unit receives valve state information from the detecting units in real-time or near-time.

18. The method of claim 15, wherein the communication interface communicates with the information module using push integration.

19. The method of claim 15, wherein the communication interface communicates with the information module using pull integration.

20. The method of claim 15, further comprising:
  transmitting the valve state information from the collection unit to the information module only when: (i) one or more of the detecting units fails to communicate with at least one collection unit, and/or (ii) one or more of the detecting units reports a change in the valve state to at least one collection unit.

* * * * *